(12) United States Patent
Schofield

(10) Patent No.: US 6,946,978 B2
(45) Date of Patent: Sep. 20, 2005

(54) IMAGING SYSTEM FOR VEHICLE

(75) Inventor: Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 131 days.

(21) Appl. No.: 10/422,378

(22) Filed: Apr. 24, 2003

(65) Prior Publication Data

US 2003/0236622 A1 Dec. 25, 2003

Related U.S. Application Data

(60) Provisional application No. 60/375,523, filed on Apr. 25, 2002.

(51) Int. Cl.⁷ ............................................. G08G 1/123
(52) U.S. Cl. ............. 340/995.28; 340/988; 340/995.25; 701/214; 701/216
(58) Field of Search .............................. 340/988, 995.1, 340/995.25, 995.28, 937; 701/207, 210, 213, 214, 216

(56) References Cited

U.S. PATENT DOCUMENTS

| | | | |
|---|---|---|---|
| 4,546,551 A | 10/1985 | Franks ........................ 33/356 |
| 4,953,305 A | 9/1990 | Van Lente et al. ............ 33/356 |
| 5,130,709 A | * 7/1992 | Toyama et al. ........ 340/995.25 |
| 5,285,060 A | 2/1994 | Larson et al. ......... 250/214 AL |
| 5,293,318 A | * 3/1994 | Fukushima ................. 701/216 |
| 5,394,333 A | * 2/1995 | Kao ........................... 701/217 |
| 5,416,313 A | 5/1995 | Larson et al. ......... 250/214 AL |
| 5,416,478 A | 5/1995 | Morinaga ................... 340/995 |
| 5,550,677 A | 8/1996 | Schofield et al. ........... 359/604 |
| 5,576,687 A | 11/1996 | Blank et al. ................ 340/438 |
| 5,632,092 A | 5/1997 | Blank et al. .................. 33/361 |
| 5,670,935 A | 9/1997 | Schofield et al. ........... 340/461 |
| 5,677,851 A | 10/1997 | Kingdon et al. ............ 364/514 |
| 5,699,044 A | 12/1997 | Van Lente et al. .......... 340/525 |
| 5,708,410 A | 1/1998 | Blank et al. ................ 340/438 |
| 5,724,316 A | 3/1998 | Brunts .......................... 368/10 |
| 5,737,226 A | 4/1998 | Olson et al. ................ 364/457 |
| 5,761,094 A | 6/1998 | Olson et al. ................ 364/559 |
| 5,790,973 A | 8/1998 | Blaker et al. ............... 701/123 |
| 5,796,094 A | 8/1998 | Schofield et al. ........ 250/208.1 |
| 5,802,727 A | 9/1998 | Blank et al. .................. 33/361 |
| 5,844,505 A | * 12/1998 | Van Ryzin .................. 340/988 |
| 5,877,707 A | 3/1999 | Kowalick ................... 340/988 |
| 5,878,370 A | 3/1999 | Olson ......................... 701/224 |
| 5,899,956 A | 5/1999 | Chan .......................... 701/213 |
| 5,959,367 A | 9/1999 | O'Farrell et al. .......... 307/10.1 |
| 5,971,552 A | 10/1999 | O'Farrell et al. ........... 359/871 |
| 6,087,953 A | 7/2000 | DeLine et al. .............. 248/549 |
| 6,091,359 A | * 7/2000 | Geier .................... 342/357.14 |
| 6,116,743 A | 9/2000 | Hoek .......................... 359/871 |
| 6,172,613 B1 | 1/2001 | DeLine et al. .............. 248/549 |
| 6,173,501 B1 | 1/2001 | Blank et al. .................. 33/356 |

(Continued)

Primary Examiner—Brent A. Swarthout
(74) Attorney, Agent, or Firm—Van Dyke, Gardner, Linn & Burkhart, LLP

(57) ABSTRACT

An imaging system suitable for use with a vehicle based global positioning system includes an imaging sensor and a control. The imaging sensor is positioned at the vehicle and may face generally forwardly with respect to the direction of travel of the vehicle. The control may be operable to provide a record of vehicle movement since the last position data derived from the vehicle based global positioning system. The imaging system may also or otherwise be suitable for use with a vehicle based magnetic compass system. The imaging system may be operable in combination with a magnetic field sensor of the magnetic compass system to provide a substantially continuously calibrated heading indication, which is substantially resistant to local magnetic anomalies and changes in vehicle inclination. The imaging sensor may be associated with one or more other accessories of the vehicle.

27 Claims, 1 Drawing Sheet

U.S. PATENT DOCUMENTS

| | | | |
|---|---|---|---|
| 6,175,164 B1 | 1/2001 | O'Farrell et al. | 307/10.1 |
| 6,222,460 B1 | 4/2001 | DeLine et al. | 248/549 |
| 6,243,003 B1 | 6/2001 | DeLine et al. | 340/425.5 |
| 6,259,412 B1 | 7/2001 | Duroux | 343/713 |
| 6,278,377 B1 | 8/2001 | DeLine et al. | 340/815.4 |
| 6,297,781 B1 | 10/2001 | Turnbull et al. | 343/713 |
| 6,326,613 B1 | 12/2001 | Heslin et al. | 250/239 |
| 6,329,925 B1 | 12/2001 | Skiver et al. | 340/815.4 |
| 6,366,213 B2 | 4/2002 | DeLine et al. | 340/425.5 |
| 6,386,742 B1 | 5/2002 | DeLine et al. | 362/135 |
| 6,420,975 B1 | 7/2002 | DeLine et al. | 340/815.4 |
| 6,428,172 B1 | 8/2002 | Hutzel et al. | 359/838 |
| 6,477,464 B2 | 11/2002 | McCarthy et al. | 701/213 |
| 6,513,252 B1 | 2/2003 | Schierbeek et al. | 33/356 |
| 6,539,306 B2 | 3/2003 | Turnbull | 701/219 |
| 6,704,621 B1 * | 3/2004 | Stein et al. | 701/1 |
| 2001/0055165 A1 | 12/2001 | McCarthy et al. | 359/839 |
| 2002/0003571 A1 | 1/2002 | Schofield et al. | 348/148 |
| 2003/0007261 A1 | 1/2003 | Hutzel et al. | 359/838 |
| 2003/0020603 A1 | 1/2003 | DeLine et al. | 340/425.5 |
| 2003/0065444 A1 | 4/2003 | McCarthy et al. | 701/213 |

\* cited by examiner

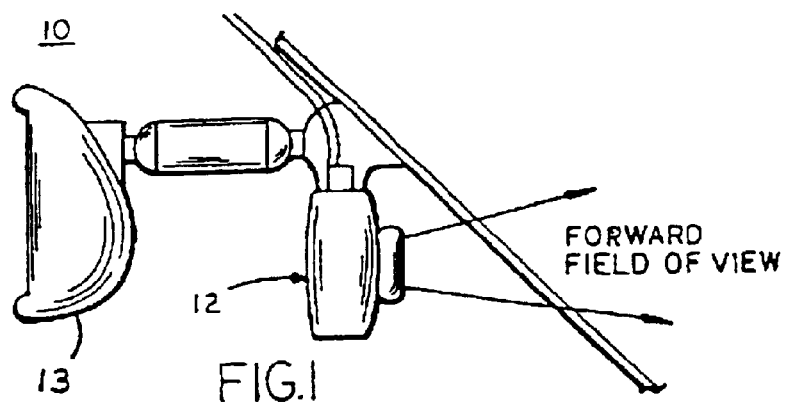
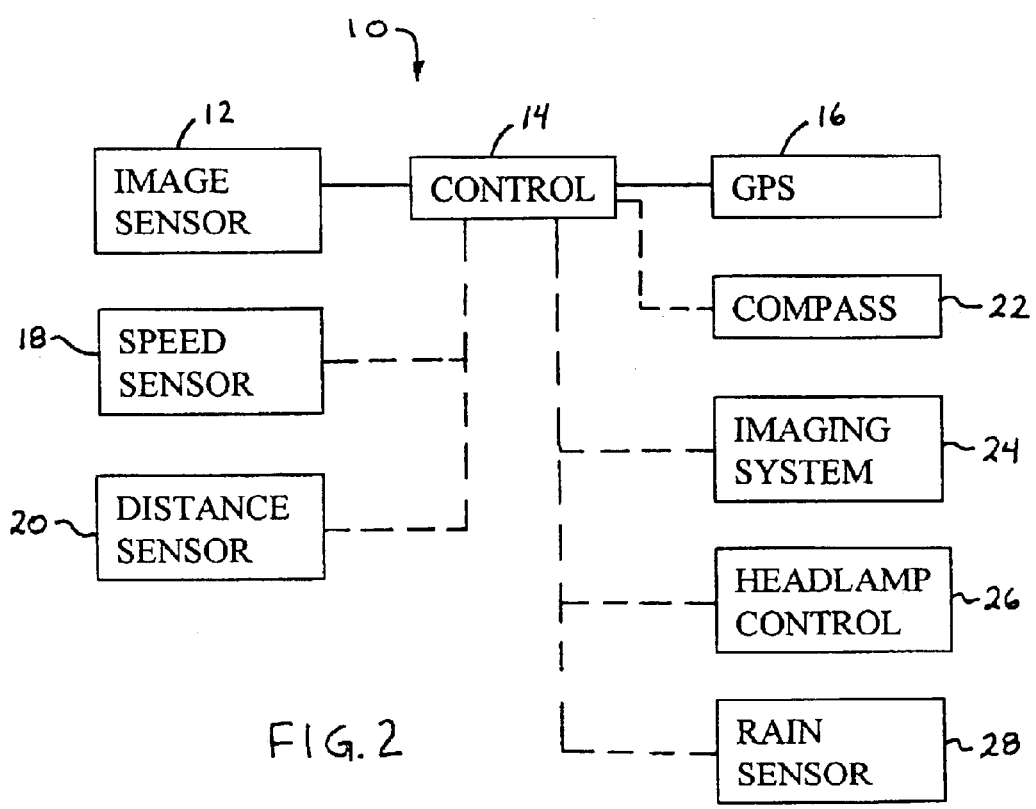

IMAGING SYSTEM FOR VEHICLE

CROSS REFERENCE TO RELATED APPLICATION

The present application claims priority on U.S. provisional application, Ser. No. 60/375,523, filed Apr. 25, 2002 by Schofield for IMAGING SYSTEM FOR VEHICLE, which is hereby incorporated herein by reference in its entirety.

FIELD OF THE INVENTION

The present invention relates generally to an imaging system for a vehicle and, more particularly, to an imaging array system for use in combination with a global positioning system and/or a magnetic compass system of the vehicle.

BACKGROUND OF THE INVENTION

Global positioning systems (GPS) are used in vehicles to determine the current position of the vehicle on the earth's surface. Current position data may be used in applications such as on-board navigation systems, remote navigation, emergency response and concierge service systems, fleet tracking applications, speed restriction violation monitoring for insurance loading purposes, vehicle recovery, and many others. One problem with global positioning systems is that they rely on an uninterrupted line-of-sight between the vehicle and a required minimum number of the satellites deployed in the particular system. In many areas or regions, particularly urban areas or regions, the line-of-sight between the vehicle and a sufficient number of satellites is not possible to maintain. Tunnels, underground or covered parking areas, and areas with many tall buildings are examples of such areas where the signal from the satellites to the global positioning system of the vehicle may be interrupted.

In order to correct for such gaps in satellite communications, global positioning systems are typically equipped with gyroscopic sensors, multi-axis accelerometers, differential compasses or magnetic compasses or the like. Data from these sensors, when combined with speed or distance traveled information from other sensors on the vehicle, may be used to determine a vehicle trajectory since the last point of satellite contact. This information is important in order to maintain the service for which the GPS data was intended, when no GPS data is available. Such information is also important to enable a rapid lock onto the available satellites when the vehicle re-emerges from the constrained situation, since the system may calculate which satellites should be in view from the new position and time and begin its search for those satellites first.

However, such gyroscopes and multi-axis accelerometers are costly and may provide inaccurate data at low speeds. Also, magnetic compasses are subject to error due to significant ferrous content in the structures common in those areas in which satellite views are restricted. Additionally, differential compasses may provide erroneous data due to differences in the rolling radii of the vehicle wheels.

SUMMARY OF THE INVENTION

The present invention is intended to provide an imaging system having an imaging sensor suitable for use in combination with a global positioning system of a vehicle and/or with a magnetic compass system of the vehicle. The imaging system is operable to track vehicle movement of a vehicle after a satellite signal for a global positioning system of the vehicle has been lost or interrupted. The imaging system may also or otherwise be operable in combination with a magnetic compass system of the vehicle to provide a continuously calibrated heading indication. The imaging sensor may also be a common component with other imaging systems of the vehicle.

According to an aspect of the present invention, an imaging system suitable for use with a vehicle based global positioning system includes an imaging sensor and a control. The vehicle based global positioning system is operable to determine a vehicle position in response to a satellite communication and to provide position data of the vehicle position. The imaging sensor is operable to capture an image of a scene exteriorly of the vehicle. The imaging sensor is positioned at one of an interior portion of the vehicle and an exterior portion of the vehicle. The control is operable to process the image and to provide a record of vehicle movement via processing of the image. The control is operable to receive the position data from the vehicle based global positioning system. The control is operable to determine a current vehicle location via the record of vehicle movement when the satellite communication to the vehicle based global positioning system is interrupted.

According to another aspect of the present invention, an imaging system suitable for use with a vehicle based magnetic compass system includes an imaging sensor and a control. The vehicle based magnetic compass system includes at least one magnetoresponsive sensor operable to determine a vehicle heading of the vehicle. The imaging sensor is operable to capture an image of a scene exteriorly of the vehicle. The imaging sensor is positioned at one of an interior portion of the vehicle and an exterior portion of the vehicle. The control is operable to process the image and to cooperatively operate with the vehicle based magnetic compass system to provide a generally continuously calibrated vehicle heading indication in response to the processing of the image and in response to an output of the at least one magnetoresponsive sensor of the vehicle based magnetic compass system. The imaging sensor is thus operable in combination with a magnetic field sensor of the magnetic compass system to provide a continuously calibrated heading indication, which may be resistant to local magnetic anomalies and changes in vehicle inclination.

The imaging system may be operable to activate and deactivate the imaging sensor and/or a display within the vehicle (which is viewable by the driver of the vehicle) in response to a seat occupancy detector which may be operable to detect an occupant in the driver's seat of the vehicle.

Therefore, the present invention provides an imaging system which is operable in connection with a global positioning system of the vehicle and/or a magnetic compass system of the vehicle. The imaging sensor suitable for use with the present invention may be useful in connection with other vehicular systems, functions and/or controls as well. For example, the imaging sensor may be an imaging array sensor useful in connection with a vehicular vision or imaging system, such as a rearward facing vision system, a forward facing vision system, a headlamp control system, a rain sensor system, a lane departure warning system, a traffic sign recognition system, a system for determining a distance to a leading vehicle or object, and/or the like. The imaging system of the present invention thus may provide a low cost means for tracking vehicle position between interrupted satellite signals and/or a low cost means for providing a continuously calibrated compass heading, since the cost associated with the imaging sensor may be spread over or shared by multiple systems or controls of the vehicle.

These and other objects, advantages, purposes and features of the present invention will become apparent upon review of the specification in conjunction with the drawings.

BRIEF DESCRIPTION OF THE DRAWINGS

FIG. 1 is a side elevation of a portion of a vehicle embodying an imaging system in accordance with the present invention; and FIG. 2 is a block diagram of an imaging system in accordance with the present invention.

DESCRIPTION OF THE PREFERRED EMBODIMENTS

Referring now to the drawings and the illustrative embodiments depicted therein, an imaging system 10 in accordance with the present invention includes an imaging sensor 12 which is positioned or mounted at a vehicle (FIGS. 1 and 2) and operable to capture an image of a scene occurring exteriorly of the vehicle. As shown in FIG. 1, the imaging sensor 12 may be mounted at an interior rearview mirror 13 at the windshield of the vehicle and may be facing generally forwardly with respect to the direction of travel of the vehicle, such that the imaging sensor may be operable to capture an image of a scene within a field of view forwardly of the vehicle. The imaging system further includes a control or control device 14 (FIG. 2) which is operable in connection with a global positioning system 16 of the vehicle. The control device 14 is operable to track or record movement of the vehicle in response to processing of images or frames captured by the imaging sensor, in order to track the position of the vehicle in situations where a satellite signal is discontinued or interrupted or otherwise not being received by the global positioning system 16 of the vehicle.

Control device 14 may be operable to analyze or process the captured frames or images or output signal or data or captured frames or images from imaging sensor 12 to determine directional movement of the vehicle. Control device may also receive an input from a vehicle speed sensor 18 and/or distance traveled sensor 20 and/or the like to determine the movement of the vehicle. The inputs from the sensors 12 and 18 and/or 20 may be analyzed or processed to determine the movement and location of the vehicle relative to a previous location of the vehicle as determined by the global positioning system 16 of the vehicle and corresponding satellite communication.

Optionally, control device 14 may be operable to analyze or process the data frame-by-frame. Such frame-to-frame or frame-by-frame analysis of the data or output from the imaging sensor 12 (which may be a forward facing sensor and may be centrally mounted on the vehicle) can provide an accurate measurement of the change of orientation of the principal vehicle axis. Therefore, when combined with the data from the vehicle speed sensor 18 or the distance traveled sensor 20, an accurate three dimensional record of the vehicle path can be maintained. Although not typically required, because the distance traveled between the capture of sequential frames may be small, data from the last frame captured may be scaled prior to a frame-to-frame correlation based on image shifts in all directions in increments of one pixel.

The imaging system of the present invention may determine vehicle movement and location of the vehicle since a previously determined location of the vehicle as determined by the global positioning system. The present invention thus may monitor or track the vehicle location for a period of time after the satellite communication to the global positioning system of the vehicle is interrupted. The imaging system may provide such vehicle position data to the driver of the vehicle through a display or the like associated with the global positioning system of the vehicle.

The imaging sensor useful with the present invention is preferably an imaging array sensor, such as a CMOS sensor or a CCD sensor or the like, such as disclosed in commonly assigned U.S. Pat. Nos. 5,550,677; 5,670,935; and 5,796,094, which are hereby incorporated herein by reference, and may include a plurality of photosensing pixels. The imaging sensor may be implemented and operated in connection with other vehicular systems as well, such as a vehicle headlamp control system 26, such as the type disclosed in U.S. Pat. No. 5,796,094, which is hereby incorporated herein by reference, a rain sensor system 28, such as the types disclosed in commonly assigned U.S. Pat. Nos. 6,353,392; 6,313,454; and/or 6,320,176, which are hereby incorporated herein by reference, a vehicle vision or imaging system 24, such as a vehicle vision system utilizing the principles disclosed in U.S. Pat. Nos. 5,550,677; 5,670,935; and 6,201,642, and/or in U.S. patent application Ser. No. 09/199,907, filed Nov. 25, 1998 by Bos et al. for WIDE ANGLE IMAGE CAPTURE SYSTEM FOR VEHICLE, now U.S. Pat. No. 6,717,610, which are hereby incorporated herein by reference, a lane departure warning system, a traffic sign recognition system, a system for determining a distance to a leading vehicle or object, such as using the principles disclosed in U.S. patent application Ser. No. 09/372,915, filed Aug. 12, 1999 by Bos et al. for VEHICLE IMAGING SYSTEM WITH STEREO IMAGING, now U.S. Pat. No. 6,396,397, which is hereby incorporated herein by reference, and/or the like.

Optionally, in another application, where a magnetic compass 22 is provided in a vehicle (such as a magnetic compass system having at least one magnetoresponsive sensor, such as a magnetoresistive sensor, a magnetoinductive sensor, a magnetocapacitive sensor, a flux gate sensor or the like, and being operable to determine a vehicle heading in response to an output of the magnetoresponsive sensor, such as a magnetic compass system of the type disclosed in U.S. patent application Ser. No. 09/540,702, filed Mar. 31, 2000 by Schierbeek et al. for VEHICLE COMPASS COMPENSATION, now U.S. Pat. No. 6,513,252, which is hereby incorporated herein by reference), it may be necessary to adjust or calibrate the compass to maintain the compass in calibration, due to changes in the magnetic signature of the vehicle, or due to changes in the value of the horizontal component of the earth's magnetic field based on the geographic location of the vehicle. It may also be necessary, during routine operation, to distinguish between the earth's magnetic field and magnetic anomalies caused by structural or reinforcing steel or other magnetic variations. By combining the data derived from frame-to-frame analysis of frames or images captured by the imaging sensor of the present invention, data from the vehicle speed sensor 18 and/or the distance traveled sensor 20, and data from magnetic compass 22, control device 14 may be operable to determine the directional heading of the vehicle and communicate such information to the compass system, whereby the compass may be maintained in accurate calibration at all times, thereby limiting or substantially avoiding the effects of local anomalies.

Because the imaging sensor may provide three dimensional data concerning the orientation of the vehicle axis, the compass heading information may be corrected for any inaccuracies which may be present due to pitch and/or roll of the vehicle.

Because many other analyses may be performed on the image data to provide other useful vehicular functions, such as another vehicle imaging system 24, such as a rearward facing imaging system or backup aid or a forward facing imaging system, such as a lane departure warning system, a traffic sign recognition system, a determination of a distance to a leading vehicle or object, and/or the like, a headlamp control system 26 and/or a rain sensor system 28 and/or the like, the basic image sensor cost may be shared between several vehicular functions or systems. The present invention thus may provide a cost effective solution to the problem of GPS function maintenance and compass calibration.

Optionally, the vehicle imaging system may be operable to be activated or deactivated in response to a detection of a driver or occupant in the driver's seat of the vehicle, in order to avoid operation of the imaging system in situations where the vehicle is not being driven or occupied and, thus, where the imaging system may not be necessary. Optionally, the vehicle may include a rearward directed imaging system, which may include one or more imaging devices or cameras positioned at the vehicle and directed generally rearwardly and generally along the side of the vehicle to capture, for example, an image of a side lane blind spot adjacent to the vehicle, or for use in a lane change aid system or the like. The imaging system may include a display for providing an image display to the driver of the vehicle which is similar to the view provided by an exterior rearview mirror of the vehicle, such as disclosed in U.S. Pat. Nos. 5,550,677 and 5,670,935, which are hereby incorporated herein by reference. In such an application, it is desirable to provide power to the imaging sensor at any and all times that a driver may need to view along and rearward of the vehicle. For example, the imaging sensor should be powered when the vehicle is being driven by the driver, and should be powered even after the vehicle ignition is turned off, but before the driver exits the vehicle, as discussed below. The imaging system may provide a visual, audible and/or tactile alert to the driver of detection of objects (such as detection of an overtaking vehicle/bicyclist/pedestrian present in a side lane) or may display a video or other display to the driver of the scene occurring adjacent to the vehicle.

The function of an automotive outside rearview mirror can thus be achieved, and in many ways enhanced, by the installation of such a rearward facing imaging sensor or video camera in or at a location similar to the exterior sideview mirror it replaces or supplements, coupled with the provision of a video or image display within the driver's field of view. One significant difference between a conventional mirror and a video mirror system used to provide the driver with a side rearward view is that electrical power is required to maintain the function of the video or camera mirror system. This raises a potential concern of what happens, for example, when a driver is sitting in a parked vehicle with the ignition off and awaiting, for example, for traffic or the like to clear to allow the driver a safe exit from the vehicle. With a non-electrical, conventional mirror, the driver can check in the mirror reflector to see what is approaching in the lane before opening the door and thus avoid accidents.

Thus, in order to make a safe exit from a vehicle, the driver must turn to look over his or her shoulder before opening the door to ensure that it is not opened into the path of a passing motor vehicle or cyclist, unless the driver can check this using a rear vision system or mirror. This task is more conveniently accomplished by monitoring the area to the side and rear of the vehicle using the exterior rearview or sideview mirror or equivalent video or imaging system. For some drivers with limited flexibility, viewing the scene via the mirror or imaging system may be the only way to ensure a safe exit from the vehicle. Thus, in addition to powering a video-based imaging system during driving, it is important to temporarily provide power whenever there is a possibility of a driver making an exit from the vehicle.

Because the driver is, by definition, outside the vehicle after making an exit from the vehicle, it is also desirable to incorporate an automatic shut down mechanism, such as based on a time out circuit, in order to avoid draining the vehicle battery. However, a "time-out after key-off" circuit may not be a fully satisfactory solution because the time between turning the ignition key to the "off" position and the exiting of the vehicle by the driver is variable and can be a long period of time. Also, the assumption that a door opening and closing sequence is an indication of driver exit may not be valid because the driver may change his or her mind about exiting the vehicle after opening the door, or may open the door for a reason other than for exit. The driver may also want to give advice to a rear seat passenger who is about to make an exit from the vehicle. It is also possible that a driver may turn the ignition key to the off position, make an exit from the vehicle, return to the vehicle without turning the ignition key to the on position, and exit the vehicle again. This procedure may be repeated several times, each time requiring the knowledge that a safe exit can be made.

Therefore, the imaging system should be powered or activated each time the driver may wish to view the rearward and sideward scene before exiting the vehicle. The video or imaging system thus should be active whenever the driver's seat is occupied. The imaging system thus may be operable or activatable and deactivatable in response to an occupancy detector or sensor operable to sense or detect an occupant in the driver's seat of the vehicle. Many techniques are available to monitor seat occupancy, including, for example, weight sensors, capacitive sensors, electromagnetic field sensors (such as the type disclosed in U.S. patent application Ser. No. 09/992,119, filed Nov. 14, 2001, now U.S. Pat. No. 6,768,420, which is hereby incorporated herein by reference), and video monitors (such as the types disclosed in U.S. patent application Ser. No. 09/793,002, filed Feb. 26, 2001, now U.S. Pat. No. 6,690,268, which is hereby incorporated herein by refereoce), or other occupancy sensors (such as the types disclosed in U.S. Pat. Nos. 6,480,103; and 6,485,081, which are hereby incorporated herein by reference) or the like. It is, however, desirable that the selected occupancy sensor have a low power consumption in order to limit or substantially avoid excessive battery drain, because, based on the above discussion, the occupancy sensor desirably is active at all times.

In order to ensure that the video system is available at all times during driving regardless of the status of any vehicle sensors, it is desirable to provide power to the system via the ignition circuit whenever the ignition key is in any position other than off. When the ignition key is in the off position and power is not available via the ignition circuit, power may be provided directly from the battery allowing the system to be active whenever the driver's seat occupancy sensor detects that the driver's seat is occupied. The present invention thus may provide a vehicle imaging system with an imaging sensor or video camera, such as a side mounted, rearward facing video camera, a display in the driver's field of view, a seat occupancy sensor (such as a driver's seat occupancy sensor), and a circuit which may put the video camera and display in an active mode whenever the seat occupancy sensor detects the presence of a person in the vehicle seat. The circuit may put the video camera and display in a deactivated mode or state when the seat occupancy sensor does not detect the presence of a person in the seat, and may deactivate the camera and display following a brief period of time after such a detection.

Therefore, the present invention provides an imaging system which is operable in conjunction with a global positioning system and/or a compass system of the vehicle. The imaging system may be operable in response to position data from the global positioning system and further in response to vehicle speed or distance traveled data or information to determine a present location of the vehicle in situations where the satellite communication to the global positioning system may be interrupted. Optionally, the imaging system may be in communication with the compass system of the vehicle and may determine the directional heading of the vehicle in response to the imaging sensor and directional heading data or information from the compass, in order to limit inaccuracies which may occur in the compass output. The captured images of the imaging sensor may be analyzed frame-by-frame to provide an accurate measurement of the change of orientation of the principal vehicle axis. The imaging system may be operable to activate and deactivate the imaging sensor or camera and/or a display within the vehicle (which is viewable by the driver of the vehicle) in response to a seat occupancy detector which may be operable to detect an occupant in the driver's seat of the vehicle.

Changes and modifications in the specifically described embodiments can be carried out without departing from the principles of the present invention, which is intended to be limited only by the scope of the appended claims as interpreted according to the principles of patent law.

What is claimed is:

1. An imaging system suitable for use with a vehicle based global positioning system, the vehicle based global positioning system being operable to determine a vehicle position in response to a satellite communication and to provide position data of the vehicle position, said imaging system, comprising:

an imaging sensor operable to capture images of a scene exteriorly of the vehicle, said imaging sensor being positioned at one of an interior portion of the vehicle and an exterior portion of the vehicle; and a control operable to process said images and to track vehicle movement via processing of said images, said control being operable to receive the position data from the vehicle based global positioning system, the position data including previous location data indicating a previous location of the vehicle determined by the vehicle based global positioning system before a satellite communication to the vehicle based global positioning system is interrupted, said control being operable to determine movement data of the vehicle via image processing of said images, said control utilizing said movement data and said previous location data determined by the vehicle based global positioning system to determine a current vehicle location record when the satellite communication to the vehicle based global positioning system is interrupted.

2. The imaging system of claim 1, wherein said imaging system is positioned to face generally forwardly with respect to the direction of travel of the vehicle, said imaging sensor being operable to capture an image of a scene forwardly of the vehicle.

3. The imaging system of claim 1, wherein said control analyzes frames of said images captured by said imaging sensor frame-by-frame.

4. The imaging system of claim 1, wherein said control processes said images captured by said imaging sensor to determine a change of orientation of a principal vehicle axis.

5. The imaging system of claim 1, wherein said control receives inputs from at least one of a vehicle speed sensor and a distance traveled sensor.

6. The imaging system of claim 5, wherein said control is operable to provide a three dimensional record of vehicle movement.

7. The imaging system of claim 1, wherein said imaging sensor comprises a pixelated imaging array sensor comprising a plurality of photosensing pixels.

8. An imaging system suitable for use with a vehicle based global positioning system, the vehicle based global positioning system being operable to determine a vehicle position in response to a satellite communication and to provide position data of the vehicle position, said imaging system comprising:

an imaging sensor operable to capture an image of a scene exteriorly of the vehicle, said imaging sensor being positioned at one of an interior portion of the vehicle and an exterior portion of the vehicle; and a control operable to process said image and to provide a record of vehicle movement via processing of said image, said control being operable to receive the position data from the vehicle based global positioning system, said control being operable to determine a current vehicle location via said record of vehicle movement when the satellite communication to the vehicle based global positioning system is interrupted, said imaging sensor comprising a pixelated imaging array sensor comprising a plurality of photosensing pixels, wherein said control is operable to scale image data from at least one frame of said images captured by said imaging sensor.

9. The imaging system of claim 8, wherein said control is operable to scale image data from one frame prior to a frame-to-frame correlation of said one frame and a successive frame of said images captured by said imaging sensor.

10. The imaging system of claim 9, wherein said control is operable to scale image data based on image shifts in at least one direction in increments of at least one pixel of said plurality of pixels.

11. The imaging system of claim 10, wherein said control is operable to scale image data based on image shifts in all directions in increments of at least one pixel of said plurality of pixels.

12. The imaging system of claim 1, wherein said imaging sensor is associated with at least one other accessory of the vehicle.

13. The imaging system of claim 12, wherein said at least one other accessory of the vehicle comprises at leant one of a rearward facing imaging system, a forward facing imaging system, an automatic head lamp control system, a lane departure warning system, a traffic sign recognition system, a distance sensing system and a rain sensor system.

14. The imaging system of claim 1, wherein said control is operable to cooperatively operate with a vehicle based magnetic compass system to provide a generally continuously calibrated vehicle heading indication in response to processing of said image and in response to an output of the at least one magnetoresponsive sensor of the vehicle based magnetic compass system.

15. Am imaging system suitable for use with a vehicle based magnetic compass system, the vehicle based magnetic compass system having at least one magnetoresponsive sensor operable to determine a vehicle heading of the vehicle, said imaging system comprising:

an imaging sensor operable to capture images of a scene exteriorly or the vehicle, said imaging sensor being positioned at one of an interior portion of the vehicle and an exterior portion of the vehicle; and a control operable to process said images, said control at least occasionally calibrating the at least one magnetoresponsive sensor of the vehicle based magnetic compass system in response to said processing of said images and in response to an output of the at least one magnetoresponsive sensor of the vehicle based magnetic compass system.

16. The imaging system of claim 15, wherein said imaging sensor is positioned to face generally forwardly with respect to the direction of travel of the vehicle, said imaging sensor being operable to capture images of a scene forwardly of the vehicle.

17. The imaging system of claim 15, wherein said imaging sensor is operable to capture multiple images and said control is operable to process said captured images frame-by-frame.

18. The imaging system of claim 17, wherein said control receives an input from at least one of a vehicle speed sensor and a distance traveled sensor.

19. The imaging system of claim 18, wherein said control is operable to combine data derived from said frame-by-frame analysis, data input from said at least one of a vehicle speed and a distance traveled sensor, and data from the at least one magnetoresponsive sensor of the vehicle based magnetic compass system.

20. The imaging system of claim 19, wherein said control is operable to substantially maintain the vehicle based magnetic compass system substantially calibrated, thereby avoiding the effects of local anomalies.

21. The imaging system of claim 15, wherein said control provides three dimensional data concerning the orientation of the vehicle axis.

22. The imaging system of claim 21, wherein said control is operable to correct vehicle heading information for any inaccuracies which may be present due to at least one of a pitch of the vehicle and a roll of the vehicle.

23. The imaging system of claim 15, wherein said control is operable to provide a substantially continuously calibrated vehicle heading indication which is substantially resistant to local magnetic anomalies and changes in vehicle inclination.

24. The imaging system of claim 15, wherein said imaging sensor is associated with at least one other accessory of the vehicle.

25. The imaging system of claim 24, wherein said at least one other accessory of the vehicle comprises at least one of a rearward facing imaging system, a forward facing imaging system, an automatic headlamp control system, a lane departure warning system, a traffic sign recognition system, a distance sensing system and a rain sensor system.

26. The imaging system of claim 15, wherein said control is operable to provide a record of vehicle movement via said processing of said image, said control being operable to receive position data from a vehicle based global positioning system, said control being operable to determine a current vehicle location via said record of vehicle movement when the satellite communication to the vehicle based global positioning system is interrupted.

27. The imaging system of claim 1 including a display for displaying vehicle location information to the driver of the vehicle, said display displaying current vehicle location when the satellite communication to the vehicle based global positioning system is interrupted.

* * * * *

UNITED STATES PATENT AND TRADEMARK OFFICE
CERTIFICATE OF CORRECTION

PATENT NO. : 6,946,978 B2
APPLICATION NO. : 10/422378
DATED : September 20, 2005
INVENTOR(S) : Kenneth Schofield It is certified that error appears in the above-identified patent and that said Letters Patent is hereby corrected as shown below:

<u>Column 6</u>:
Line 35, "scat" should be --seat--.
Line 43, "refereoce" should be --reference--.

<u>Column 7</u>:
Line 38, Claim 1, Delete "," after "system".
Line 57, Claim 1, Delete "record" after "location".

<u>Column 8</u>:
Line 52, Claim 13, "leant" should be --least--.
Line 64, Claim 15, "Am" should be --An--.

<u>Column 9</u>:
Line 2, Claim 15, "or" should be --of--.

Signed and Sealed this

Twenty-ninth Day of April, 2008

JON W. DUDAS
*Director of the United States Patent and Trademark Office*